(12) United States Patent
Utaki et al.

(10) Patent No.: US 7,392,650 B2
(45) Date of Patent: Jul. 1, 2008

(54) CABLE PROTECTION AND GUIDE DEVICE

(75) Inventors: Akihiko Utaki, Osaka (JP); Masaaki Ikeda, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/637,429

(22) Filed: Dec. 11, 2006

(65) Prior Publication Data

US 2007/0170305 A1    Jul. 26, 2007

(30) Foreign Application Priority Data

Jan. 20, 2006    (JP) ............................. 2006-012740

(51) Int. Cl.
*F16G 13/00* (2006.01)

(52) U.S. Cl. .......................................... 59/78.1; 248/49

(58) Field of Classification Search .................. 59/78.1, 59/900; 248/49, 51
See application file for complete search history.

(56) References Cited

U.S. PATENT DOCUMENTS

| | | | |
|---|---|---|---|
| 5,635,675 A | | 6/1997 | Houga |
| 6,423,901 B2 * | | 7/2002 | Richter ........................ 474/145 |
| 6,459,037 B2 * | | 10/2002 | Muller et al. .................. 174/19 |
| 6,516,602 B2 * | | 2/2003 | Sakai et al. .................... 59/78.1 |
| 6,573,451 B2 * | | 6/2003 | Komiya et al. ............... 174/68.1 |
| 6,708,480 B1 * | | 3/2004 | Wehler ........................ 59/78.1 |
| 6,725,642 B2 | | 4/2004 | Tsutsumi et al. |
| 6,745,555 B2 | | 6/2004 | Hermey et al. |
| 6,858,797 B2 * | | 2/2005 | Sheikholeslami et al. ... 174/480 |
| 6,984,782 B2 | | 1/2006 | Ikeda et al. |
| 7,204,075 B2 | | 4/2007 | Utaki |
| 7,317,160 B2 | | 1/2008 | Utaki |
| 2003/0182924 A1 | | 10/2003 | Tsutsumi et al. |
| 2007/0068694 A1 | | 3/2007 | Utaki |
| 2007/0163795 A1 | | 7/2007 | Utaki et al. |

FOREIGN PATENT DOCUMENTS

| | | |
|---|---|---|
| JP | 2003-299238 | 10/2003 |
| WO | WO 02/086349 A1 | 10/2002 |

\* cited by examiner

*Primary Examiner*—David B Jones
(74) *Attorney, Agent, or Firm*—Woodling, Krost and Rust

(57) ABSTRACT

A cable or the like protection and guide device is disclosed which prevents inadvertent disconnection due to repeated flexure. Excellent fatigue resistance is exhibited. A cable or the like protection and guide device in which pairs of side plates are respectively formed of a highly-rigid resin front side plate portion connected to a preceding side plate and a highly-rigid resin rear side plate portion is connected to a subsequent side plate. A flexible fatigue resistant resin coupling portion is interposed between the front side plate portion and the rear side plate portion in an integrated manner by using a using two-color molding.

2 Claims, 8 Drawing Sheets

CABLE PROTECTION AND GUIDE DEVICE

This application claims priority of Japanese patent Application No. 2006-012740 filed Jan. 20, 2006.

TECHNICAL FIELD

The present invention relates to a cable protection and guide device. More specifically it relates to a cable protection and guide device suitable for accommodating a cable (cables) or a hose (hoses) which supplies a movable member of an industrial machine with electric power or compressed air. The machine safely and reliably guides and protects a cable (cables) during movement of the movable portion.

BACKGROUND TECHNOLOGY

A conventional cable protection and guide device known as an energy guide chain includes side plates connected to each other with coupling elements separate from the side plate. See, for example, Patent Reference 1 which is published Japanese translation of PCT application no.2004-527706.

Alternatively, another conventional cable protection and guide device is known which includes side plates connected to each other by fitting connecting rods integrally formed on each side plate to connecting grooves between the side plates. See, for example, Patent Reference 2, which is Japanese Laid-Open Patent Publication No. 2003-299238.

PROBLEMS TO BE SOLVED BY THE INVENTION

In an energy guide chain as in Patent Reference 1 the side plate and a coupling element are separately formed from each other. As such a large number of parts are required with a significant amount of assembly required.

Further, in such an energy guide chain as in the Patent Reference 1, since a side plate and a coupling element are separately formed, there was a troublesome problem in maintenance that mutual connection and disconnection of the side plates took much time and effort.

Further, in the energy guide chain as in the Patent Reference 1, since the side plates are connected to each other by fitting coupling elements separate from the side plate between the side plates, there was a problem that displacements were gradually generated between a side plate and a connecting member by repetition of flexional operations between links and the chain would break and disconnect at the coupling portion. Further there was a problem that in a case where no displacement between a side plate and a coupling element in such a coupling portion occurred, an excessive stress concentration was generated at the coupling portion during a flexional operation so that the coupling portion was prematurely broken.

In the cable protection and guide device as in Patent Reference 2, a connecting rod is formed in a manner protruding outside a side edge of the side plate. The connecting rod serves as a flexional portion for flexibly connecting link bodies to each other. The connecting rod has a configuration to support a load on a side plate during restriction of the mutual flexion of connecting side plates. As such, there was a possibility that the flexional portion composed of connecting rods would break so shortening the service life of the guide. That is, in the protection and guide device of Patent Reference 2, there was a problem that the connecting rod would be broken by the load applied during restriction of flexion shortening service life.

Further, in the protection and guide device of Patent Reference 2, since the side plates are connected to each other by fitting a connecting rod between the side plates into a connecting groove, there was a problem that displacements gradually generated between the connecting rod between the side plates and the connecting groove by repetition of flexional operations between link bodies and the guide device caused breakage at a coupling portion. Further there was a problem that even in the case where no displacement between the connecting rod and the connecting groove in such a coupling portion occurred, an excessive stress concentration was generated at the proximal portion of the connecting rod during a flexional operation so that a connecting rod protruding from the side plate would be prematurely broken.

SUMMARY OF THE INVENTION

Accordingly, the object of the present invention is to solve the above-mentioned problems. A cable protection and guide device is provided in which inadvertent disconnection is prevented. Breakage of the coupling portion of a side plate due to the repetition of flexional operations is prevented. Excellent fatigue resistance to repeated flexion is achieved. Excellent stability of the cable protection device is exhibited.

MEANS FOR SOLVING THE PROBLEMS

The invention attains the above-mentioned object by providing a number of pairs of right and left spaced side plates which are connected to each other in a longitudinal direction. Connecting arms are bridged over flexional inner circumferential sides and flexional outer circumferential sides of the side plates at predetermined intervals. A cable is accommodated in a cable accommodating space surrounded by the side plates and the connecting arms. Each of the side plates includes a front side plate portion which is formed of a highly-rigid resin and is connected to a preceding side plate. Each of the side plates includes a rear side plate portion formed of a highly-rigid resin and is connected to a subsequent side plate. Each of the side plates includes a flexible fatigue resistant resin coupling portion interposed between the front side plate portion and the rear side plate portion in an integrated manner by using a two-color mold.

And the invention attains the above-mentioned object by employing the highly-rigid resin such as polyamide 6-GF compounding agent. A fatigue resistant resin such as polyamide 66-rubber compounding agent is also used to attain the above-mentioned object.

EFFECTS OF THE INVENTION

First, according to the cable or the like protection and guide device of the invention, since a number of pairs of right and left spaced side plates are connected to each other in a longitudinal direction and connecting arms are bridged over flexional inner circumferential sides and flexional outer circumferential sides of the side plates in predetermined intervals, a cable or the like can be accommodated in a cable accommodating space surrounded by the side plates and the connecting arms along the longitudinal direction.

Each of the side plates are formed of a highly-rigid resin front side plate portion connected to a preceding side plate. Each of the rear side plate portions are formed of a highly-rigid resin rear side plate portion connected to a subsequent side plate. Each of the coupling portions of the side pates are formed of flexible fatigue resistant resins. Each of the coupling portions are interposed between the front side plate portion and the rear side plate portion in an integrated manner by a two-color molding process. As such, the front side plate portion and the rear side plate portion are strongly integrated through the two-color molded coupling portion. Thus, given the features of the side plates and their construction, inadvertent disconnection, which is liable to occur in the coupling portion of a side plate due to the repetition of flexional operation, can be prohibited, reduced or resolved. Further, since a coupling portion made of a fatigue resistant resin is flexibly provided for repeated flexion, an excellent fatigue resistance to repeated flexion is exhibited. And since the front side plate portion and the rear side plate portion which are made of a highly-rigid resin concentrically transfers a flexional strain, which is liable to occur during a flexional operation, to the coupling portion to be absorbed therein, the cable or the like protection and guide device of the invention exhibits excellent stability and form.

Further, according to the cable or the like protection and guide device of the invention, since the highly-rigid resin is a polyamide 6-GF (glass fiber) compounding agent and the fatigue resistant resin is a polyamide 66-rubber compounding agent, the GF compounded in polyamide 6 as a highly-rigid resin adds extremely high rigidity to the resin whereby excellent stability and form can be exhibited. Further, since a rubber component adds strong flexibility to the impact resistance by being compounded with polyamide 66 as a fatigue resistance resin, an excellent fatigue resistance to repeated flexion is attained.

These and other objects of the invention will be better understood when reference is made to the Brief Description Of The Drawings, Description of the Invention and Claims which follow hereinbelow.

Figure 1:
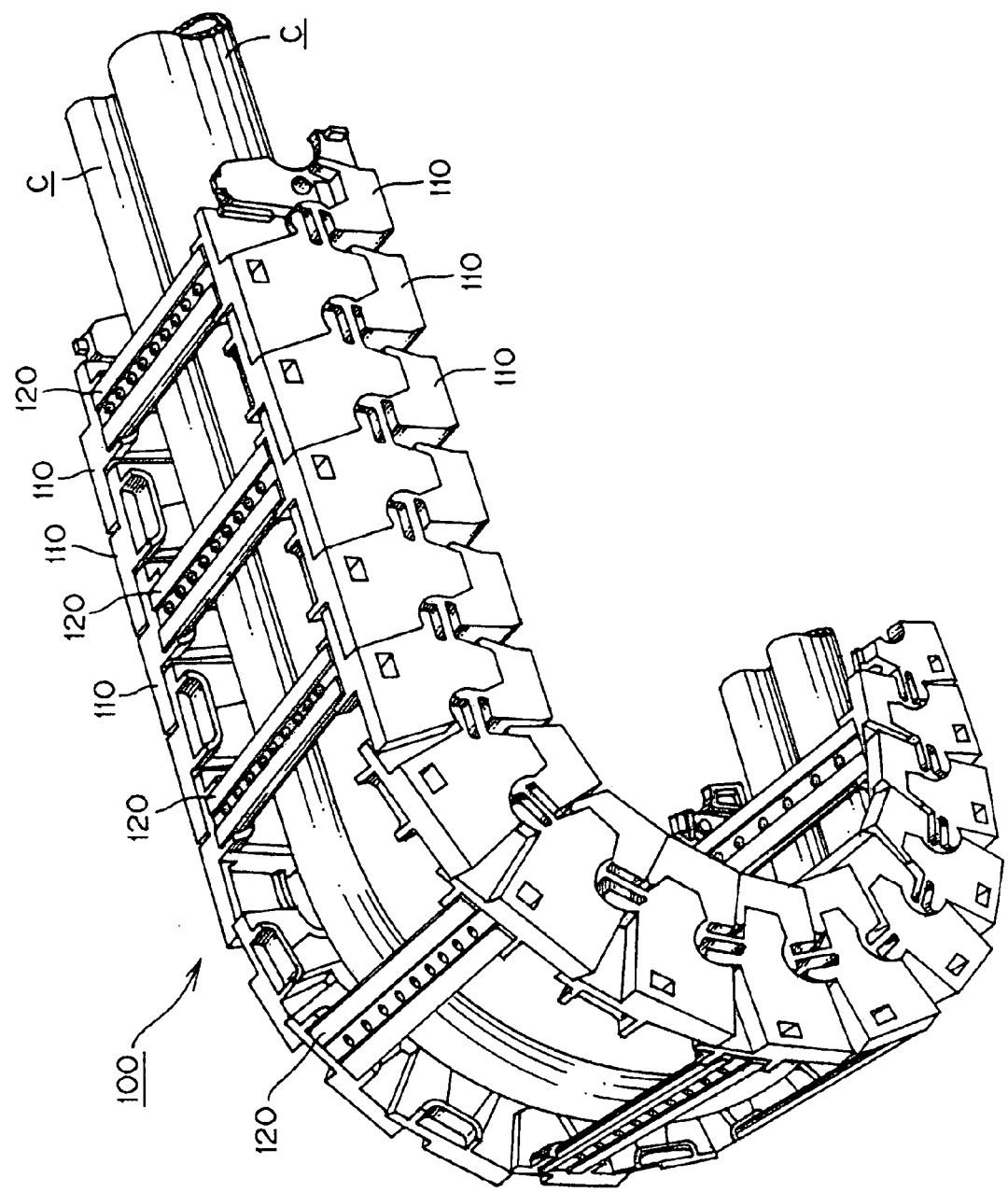
FIG. 1 is an entire view of a cable or the like protection and guide device, which is an example of the present invention.

A better understanding of the drawings will be had when reference is made to the Description of the Invention and Claims which follow hereinbelow.

DESCRIPTION OF THE INVENTION

A cable or the like protection and guide device in which a number of pairs of right and left spaced side plates are connected to each other in a longitudinal direction. Connecting arms are bridged over flexional inner circumferential sides and flexional outer circumferential sides of the side plates in predetermined intervals. A cable or the like is accommodated in a cable accommodating space surrounded by the side plates and the connecting arms along the longitudinal direction.

Each of the side plates is formed of a highly-rigid resin front side plate portion connected to a preceding side plate. Each of the rear side plate portions is formed of a highly-rigid resin and is connected to a subsequent side plate. Each of the side plates includes a coupling portion formed of a flexible fatigue resistant resin coupling portion interposed between the front side plate portion and the rear side plate portion in an integrated manner by a two-color molding process. Inadvertent disconnection, which is liable to occur in a coupling portion of a side plate due to repeated flexional operation, is resolved. Excellent fatigue resistance to repeated flexion and excellent stability is achieved.

First, a crude material of the two-color molded side plate in a cable or the like protection and guide device according to the present invention is as follows. That is the crude material of a front side plate portion and a rear side plate portion of the side plate may be a resin such as polyamide 6, polyamide 12, polyamide 46, polyamide 66, acryl, polyacetal or the like, which is easy to mold. The resin just mentioned are engineering plastic resins which resist flexional strain liable to occur during a flexional operation so that excellent stability of the cable device is exhibited. Particularly, when a polyamide 6-GF compound agent is adopted, the GF (glass fiber) compounded in the polyamide 6 adds extremely high rigidity to the resin and excellent stability of the cable device is achieved. Thus the polyamide 6-GF compound agent is preferred.

Alternatively, the crude material of the front side plate portion and the rear side plate portion of the side plate, which flexibly provides for repeated flexion, may be a resin such as a polyamide 6-rubber compound agent, polyamide 66-rubber compound agent, polyamide 12, elastomer or the like. The resins just mentioned are engineering plastic resins which exhibit excellent fatigue resistance to repeated flexion. Particularly, when a polyamide 66-rubber compound agent is used, the rubber component compounded in the polyamide 66 exhibits flexibility, is impact resistant, and an exhibits excellent fatigue resistance. Thus the polyamide 66-rubber compound agent is preferred.

Further, although the cable or the like protection and guide device according to the present invention includes a linear position holding surface for holding a cable or the like in a linear position and also includes a flexional position restricting surface for restricting the cable or the like, the linear position holding surface and the flexional position restricting surface may be provided on any portion on the flexional outer circumferential side or flexional inner circumferential side of a side plate other than a coupling portion of the side plate. The linear position holding surface and the flexional position restricting surface may be provided even on an end surface or a side surface of the side plate.

For example, when the linear position holding surface is formed on a flexional outer circumferential side portion other than the coupling portion of the side plate and the flexional position restricting surface is formed on a flexional inner circumferential side portion other than the coupling portion of the side plate, a load, which is liable to occur at the coupling portion, which becomes a flexional portion during the flexional position restriction, is avoided so that excellent endurance can be exhibited. And, the linear connection state and the flexional connection state can be reliably held. Thus such an arrangement of the linear position holding surface and the flexional position restricting surface is preferred in their handling.

Further, when the linear position holding surface is formed on a flexional outer circumferential side portion other than the coupling portion of the side plate and on a flexional inner circumferential side portion other than the coupling portion thereof, and the flexional position restricting surface is formed on a flexional outer circumferential side portion other than the coupling portion of the side plate and on a flexional inner circumferential side portion other than the coupling portion of the side plate, a load, which is liable to occur at the coupling portion, which becomes a flexional portion during the flexional position restriction, is avoided so that excellent endurance is exhibited. The surface contact load (between the side plates which is generated during the flexional position restriction and during the linear position holding) is dispersed into two parts on the flexional outer circumferential side and the flexional inner circumferential side. The linear connection state and the flexional connection state can be endurably and reliably held. Thus, such an arrangement of the linear position holding surface and the flexional position restricting surface is preferred.

A concave portion/convex portion engagement mechanism provided between a rear side plate portion of a preceding side plate and a front side plate portion of a side plate subsequently connected to the rear side plate portion in the cable and guide device of the present invention may be in any form. For example, a first engagement protrusion and a hole to be engaged, disposed on a front end surface or a side surface in a front side plate portion of a side plate and a portion to be engaged or a second engagement protrusion disposed on a rear end surface or a side surface in a rear side plate portion of the side plate opposite to the first engagement protrusion or the hole to be engaged.

EXAMPLE

Figure 9:
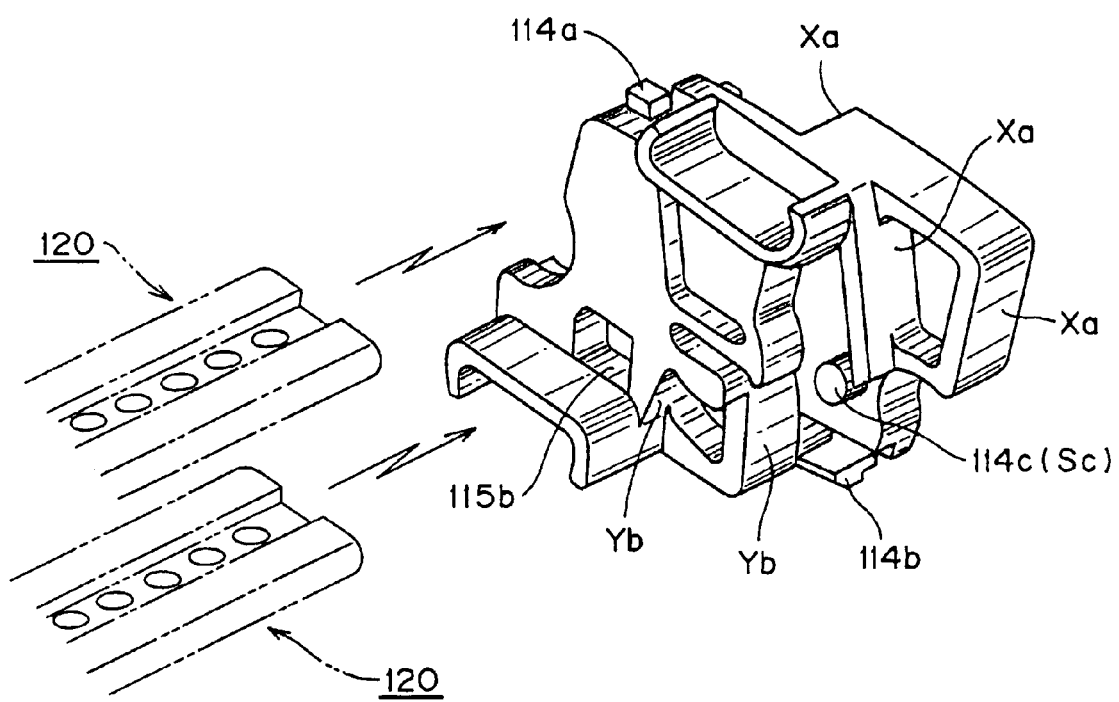
FIG. 9 is a perspective view of a side plate viewed from a direction G in FIG. 6.

A cable or the like protection and guide device 100, which is an example of the present invention, will be described with reference to FIGS. 1 and 9.

Figure 2:
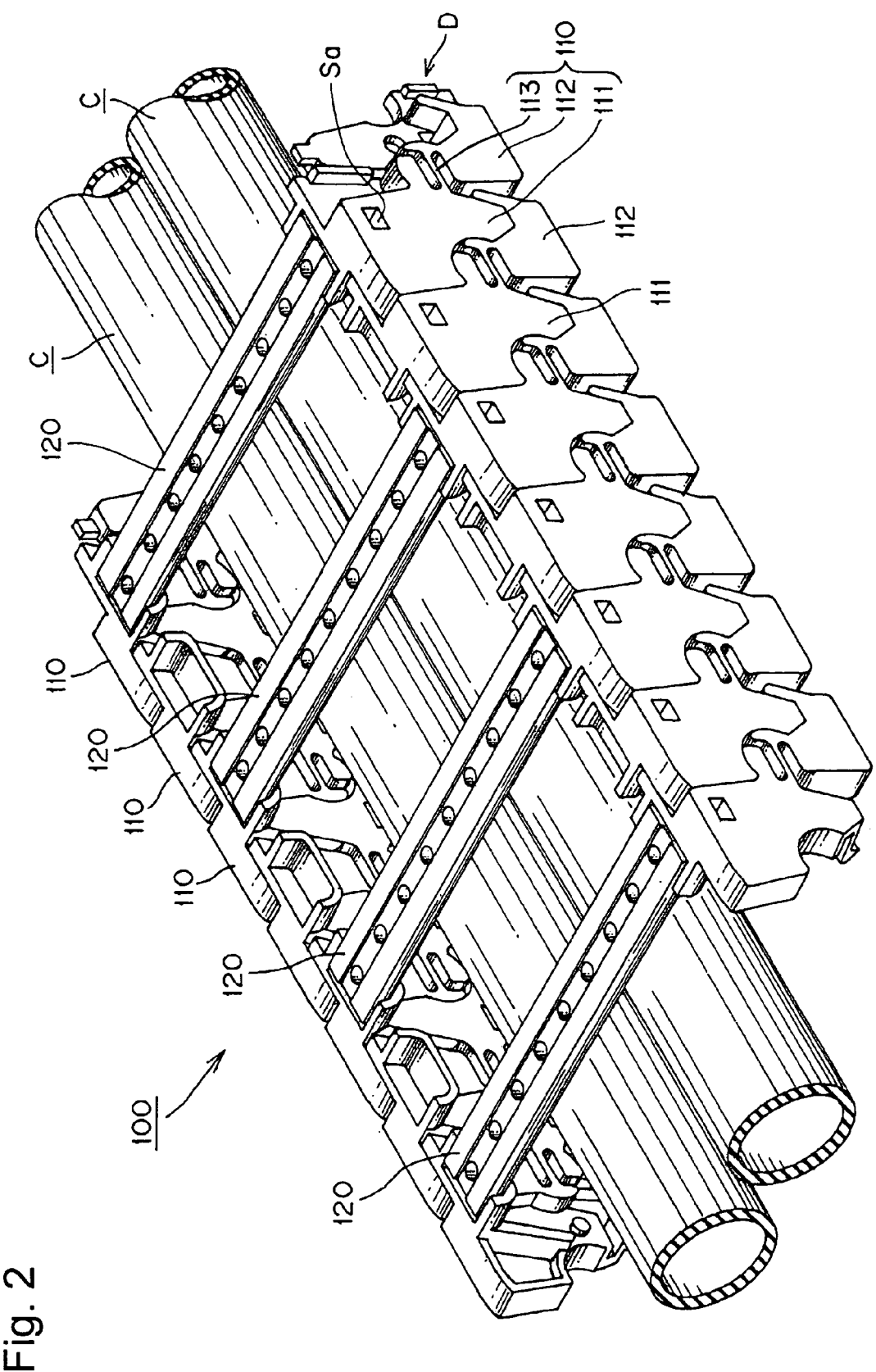
FIG. 2 is a perspective view of a linear connection state in the cable or the like protection and guide device in FIG. 1.
Figure 3:
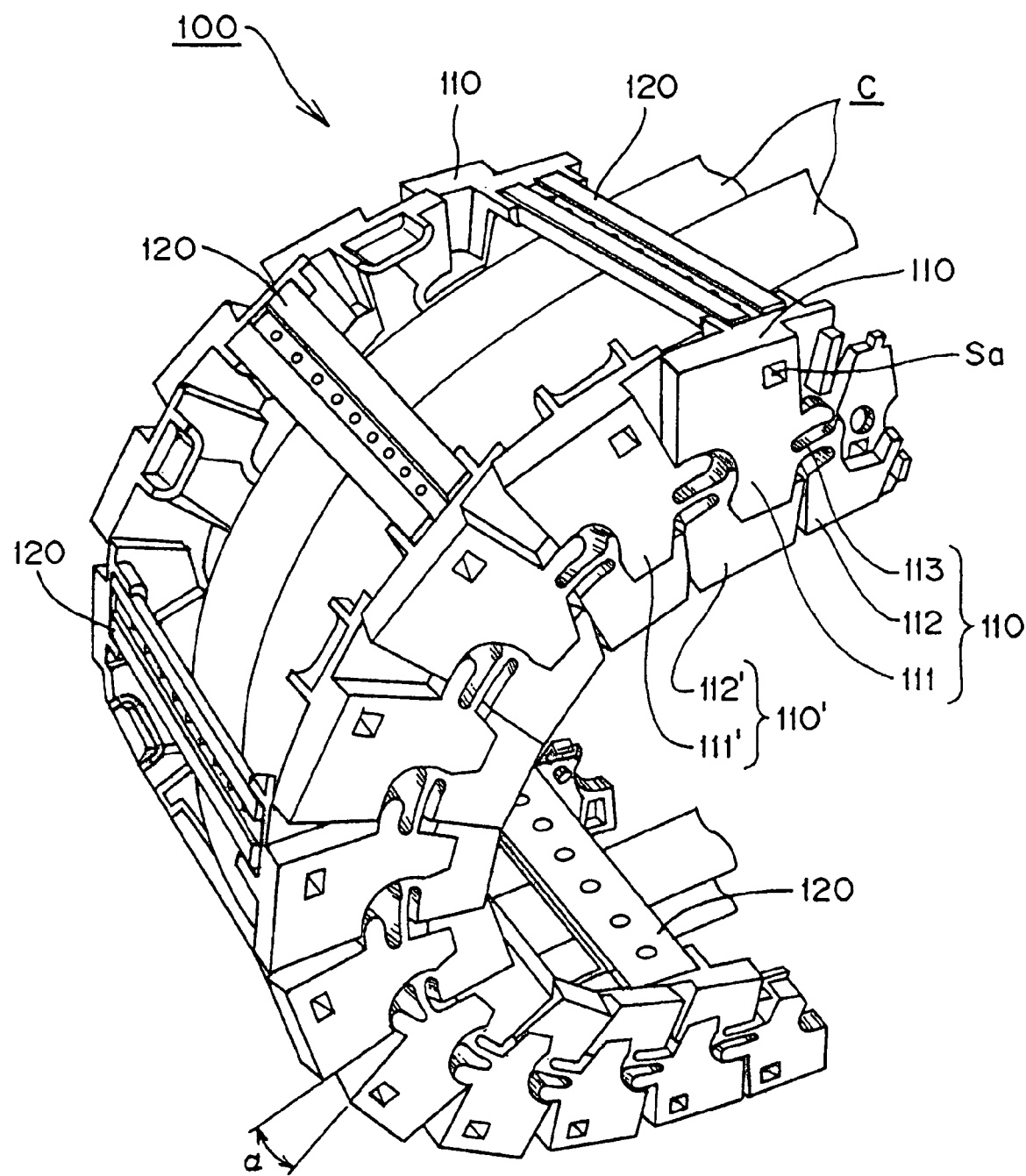
FIG. 3 is a perspective view of a flexional connection state in the cable or the like protection and guide device in FIG. 1.
Figure 4:
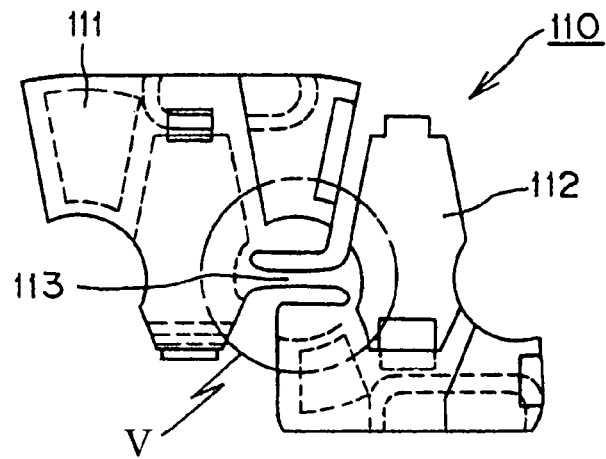
FIG. 4 is a side view of a side plate used in the cable or the like protection and guide device in FIG. 1.
Figure 5:
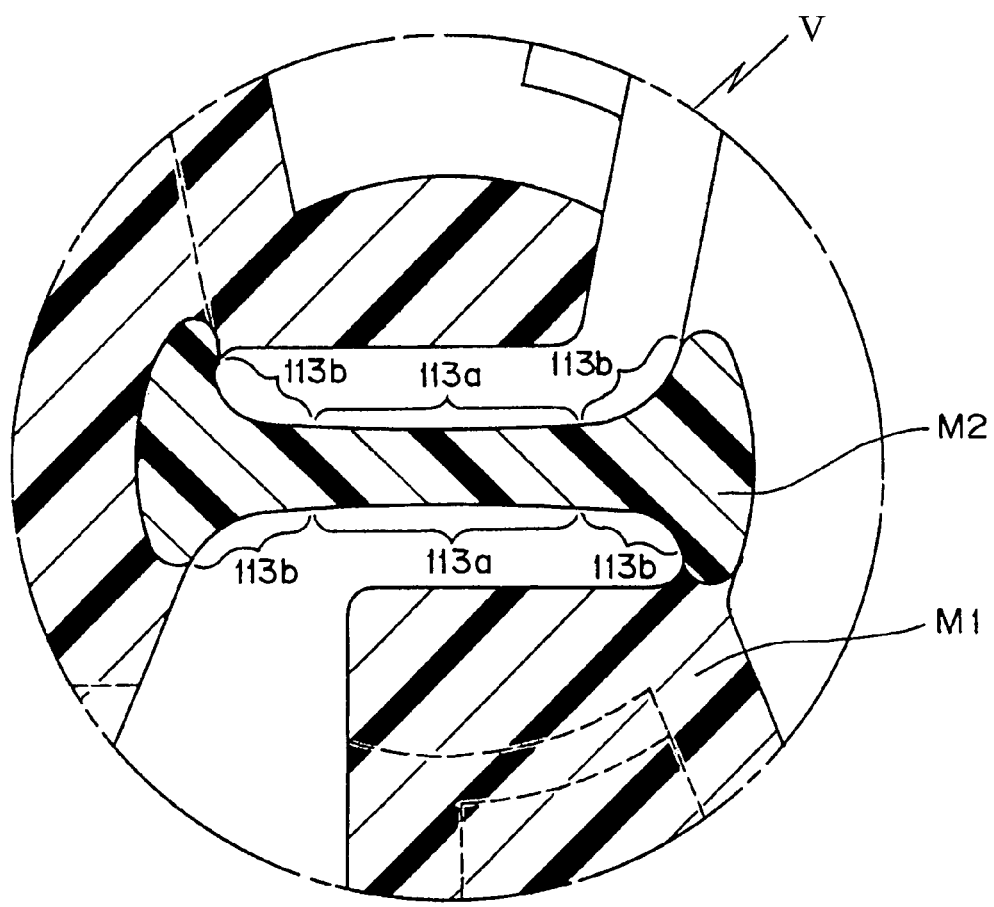
FIG. 5 is an enlarged cross-sectional view of an area in the vicinity of a coupling portion shown by V in FIG. 4.
Figure 6:
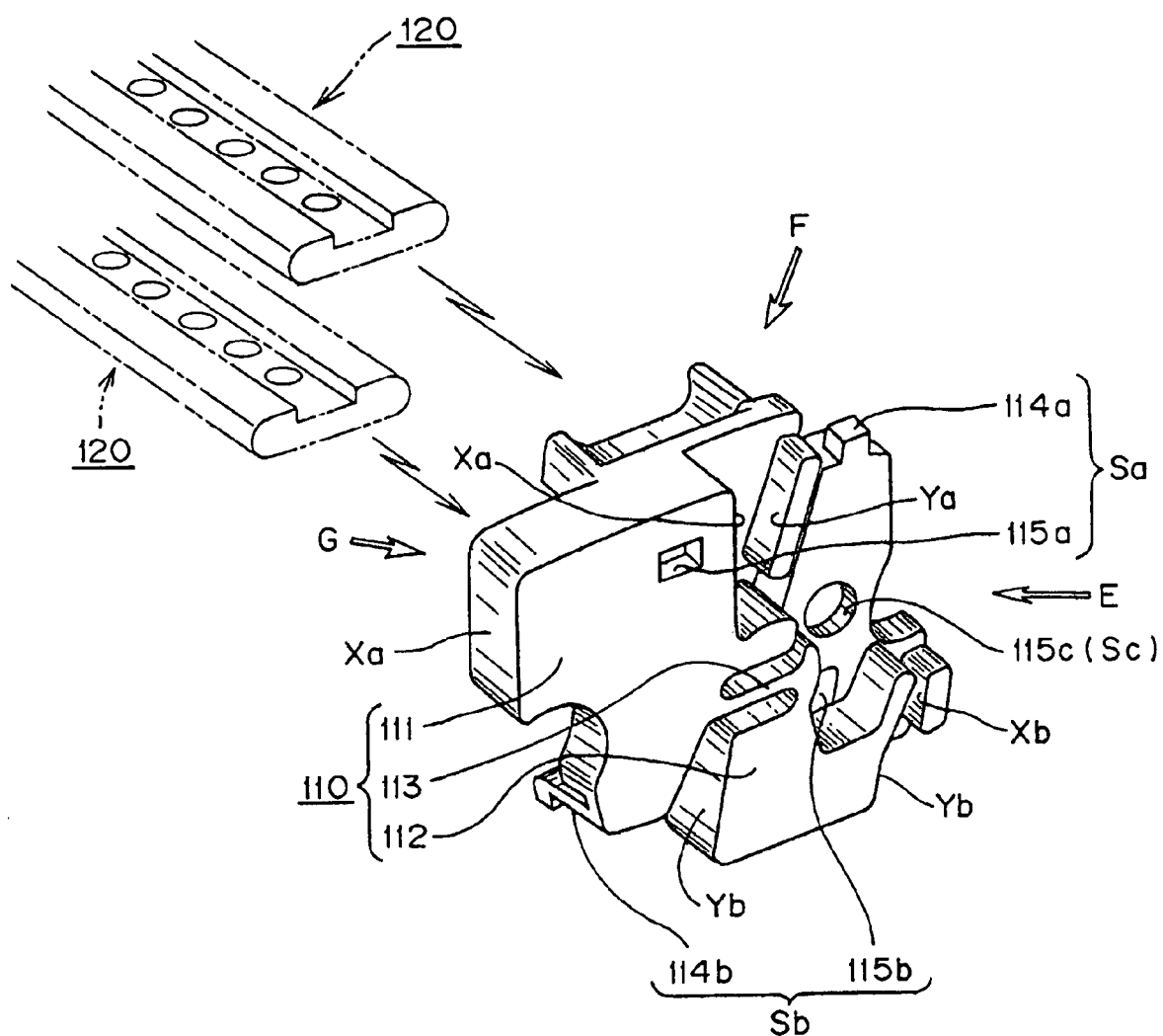
FIG. 6 is a perspective view of a side plate shown by an arrow D in FIG. 2.
Figure 7:
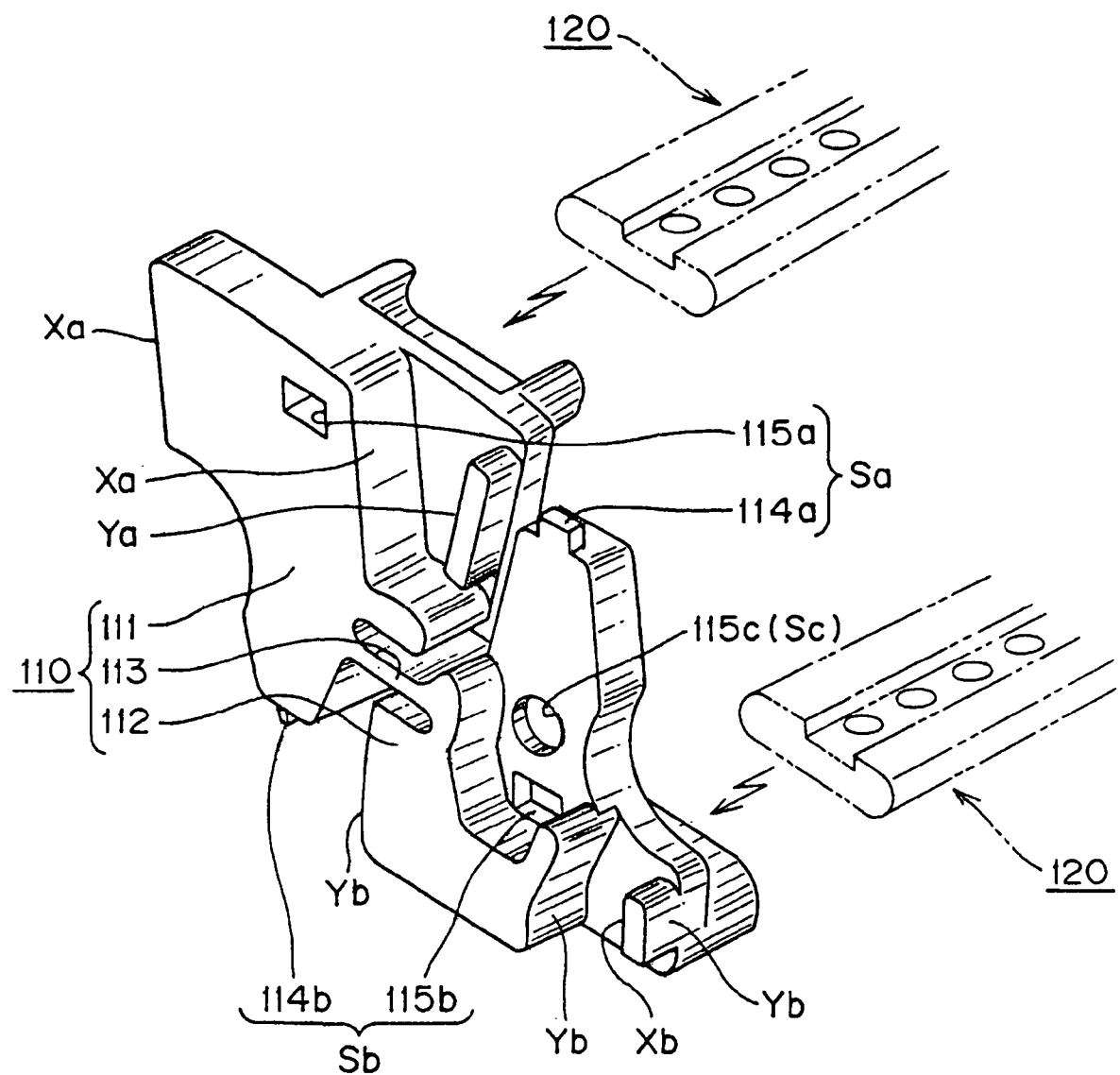
FIG. 7 is a perspective view of a side plate viewed from a direction E in FIG. 6.
Figure 8:
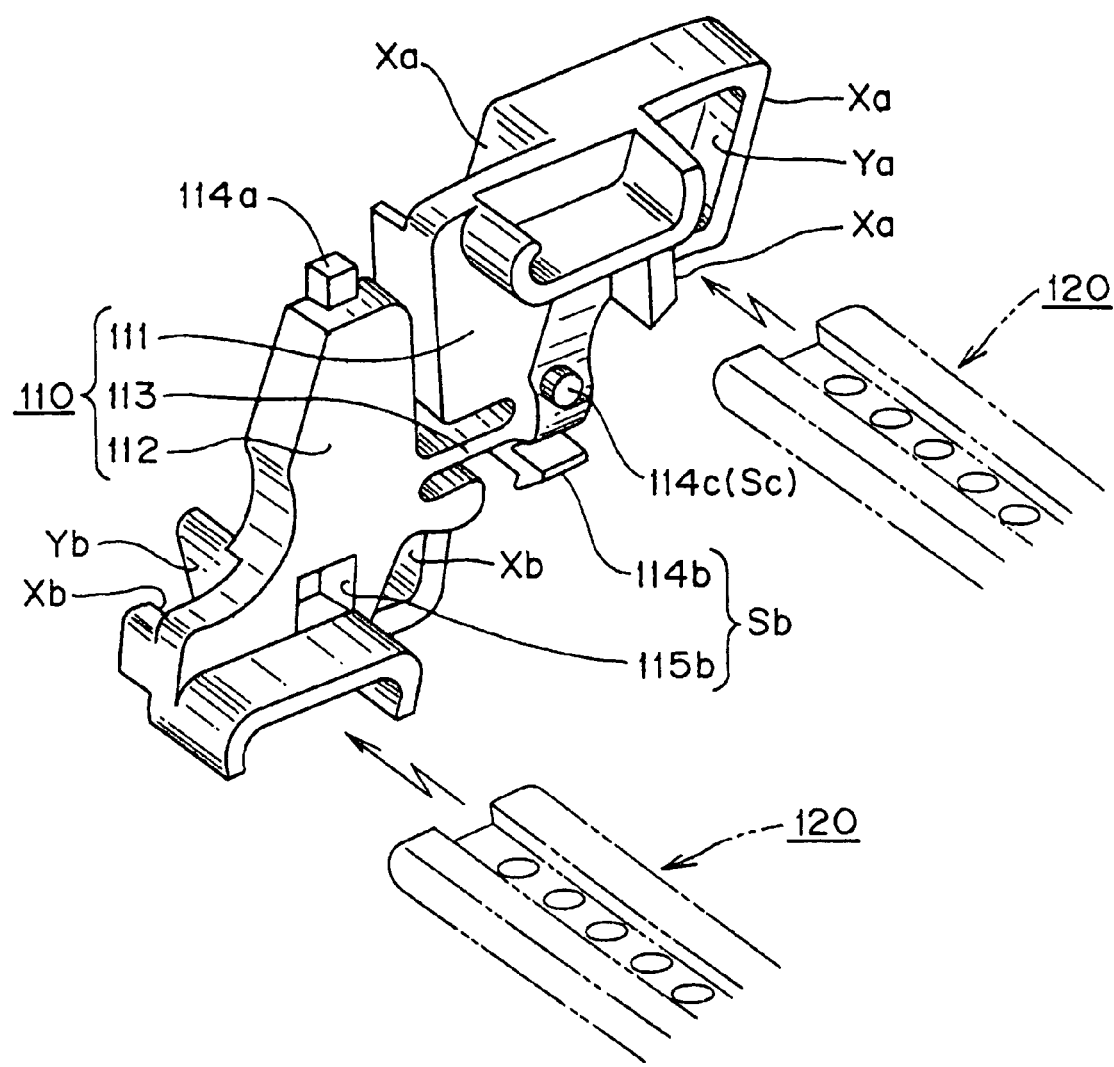
FIG. 8 is a perspective view of a side plate viewed from a direction F in FIG. 6.

Here, FIG. 1 is an entire view of a cable or the like protection and guide device 100, which is an example of the present invention. FIG. 2 is a perspective view of a linear connection state in the cable or the like protection and guide device 100 in FIG. 1. FIG. 3 is a perspective view of a flexional connection state in the cable or the like protection and guide device 100 in FIG. 1. FIG. 4 is a side view of a side plate used in the cable or the like protection and guide device 100 in FIG. 1. FIG. 5 is an enlarged cross-sectional view of an area in the vicinity of a coupling portion shown by V in FIG. 4. FIGS. 6 to 9 are perspective views of the side plate used in the cable or the like protection and guide device 100. Particularly, FIG. 6 is a perspective view of a side plate shown by an arrow D in FIG. 2. FIG. 7 is a perspective view of a side plate viewed from a direction E in FIG. 6. FIG. 8 is a perspective view of a side plate viewed from a direction F in FIG. 6, and FIG. 9 is a perspective view of a side plate viewed from a direction G in FIG. 6.

The cable or the like protection and guide device 100, which is an example of the present invention, is used for protecting and guiding cables or the like C such as electric cables, which connect between a movable portion and a stationary portion in a semiconductor device, a pharmacy development testing device, a door opening/closing device for a vehicle or the like. In this way the invention carries out transmission and supply of electrical signals and the supply of pressure (liquid or gas). The invention longitudinally connects between the movable portion and the stationary portion (not shown), and further the device 100 can exhibit a linear position or a flexional position in accordance with relatively remote movement conditions between the movable portion and the stationary portion. As shown in FIGS. 1 to 3, the cable or the like protection and guide device 100 is formed in such a manner that a number of pairs of right and left spaced side plates 110, 110 are connected to each other in a longitudinal direction and connecting arms 120 are bridged over flexional inner circumferential sides and flexional outer circumferential sides of these side plates 110, 110. The connecting arms 120 are arranged in alternate intervals of the side plates 110, 110 so that a cable (cables) or the like C is (are) accommodated in a cable accommodating space with a rectangular section, surrounded by pairs of right and left side plates 110, 110. The connecting arms 120, 120 are arranged on the flexional inner circumferential sides and the flexional outer circumferential sides in a bridged manner along the longitudinal direction.

It is noted that the above-mentioned movable portion and stationary portion are not shown in FIG. 1. Further, although, in this example the connecting arms 120 are bridged in alternate arrangement intervals with respect to the side plates 110, 110 connected to each other in a large number, for example they may be bridged by the correspondence of 1 to 1 in the respective side plates 110 connected to each other in a large number.

And the side plates 110, 110 used in the example are molded using a two-color molding process and its spaced right and left pair is symmetrical. That is the side plate 110 is integrally formed of a highly-rigid resin (M1) front side plate portion 111 connected to the preceding side plate 110'. A highly-rigid resin (M1) rear side plate portion 112 connected to the subsequent side plate 110. And, a flexible fatigue resistant resin (M2) coupling portion 113 integrally interposed between the front side plate portion 111 and the rear side plate portion 112. And, the highly-rigid resin (M1) a polyamide 6-GF compound agent is preferably used as is the fatigue resistant resin (M2) a polyamide 66-rubber compound agent.

Between the rear side plate portion 112 of the preceding side plate (not shown) and the front side plate portion 111 of the side plate 110 subsequently connected to the rear side plate portion 112 are, as shown in FIGS. 6 to 9, respectively provided a flexional outer circumferential side concave portion/convex portion engagement mechanism Sa, a flexional inner circumferential side concave portion/convex portion engagement mechanism Sb and a concave portion/convex portion engagement mechanism Sc adopted in the vicinity of a coupling portion 113, which are engaged to each other. As shown in FIGS. 1 to 3, side plates 110, 110 adjacent to each other through these concave portion/convex portion engagement mechanisms Sa, Sb and Sc are attachable to and detachable from each other. Thus the maintenance of the cable or the like protection and guide device 100 can be easily performed during connection and disconnection of the side plates 110, 110.

The concave portion/convex portion engagement mechanism Sa adopted on the flexional outer circumferential side of the example of the present invention comprises an engagement protrusion 114a composed of a hook-shaped engagement hook and a window-shaped hole 115a to be engaged. The window-shaped hole 115A detachably engages the engagement protrusion 114a composed of a hook-shaped engagement hook. The concave portion/convex portion engagement mechanism Sb adopted on the flexional inner circumferential side comprises an engagement protrusion 114b composed of a hook-shaped engagement hook and a window-shaped hole 115b to be engaged. The window-shaped hole detachably engages the engagement protrusion 114b composed of a hook-shaped engagement hook.

The concave portion/convex portion engagement mechanism Sc adopted in the vicinity of a coupling portion 113 of the side plate 110 comprises an engagement protrusion 114c composed of a cylindrical engagement pin and a window-shaped hole 115c to be engaged. The window-shaped hole 115c detachably engages the engagement protrusion 114c composed of the engagement pin.

Further, between a stepped, offset side surface of a front side plate portion 111 positioned on a flexional outer circumferential side other than a coupling portion 113 of the side plate 110 and a front end of the front side plate portion of the subsequent side plate (not shown) and between a stepped, offset side surface of a rear side plate portion 112 positioned on a flexional inner circumferential side other than the coupling portion 113 of the side plate 110 and a front end of the rear side plate portion of the subsequent side plate (not shown) are formed two sets of linear position holding surfaces. Each of the linear position holding surfaces holds a linear connection state of the side plate 110, that is, a flexional outer circumferential side linear position holding surface Xa and a flexional inner circumferential side linear position holding surface Xb, respectively.

Further, between a stepped, offset side surface of a rear side plate portion 112 positioned on a flexional inner circumferential side other than a coupling portion 113 of the side plate 110 and a front end of the rear side plate portion of the subsequent side plate (not shown) and between a stepped, offset side surface of a front side plate portion 111 positioned on a flexional outer circumferential side other than the coupling portion 113 of the side plate 110 and a stepped, offset side surface of a rear side plate portion of the subsequent side plate (not shown) are formed two sets of flexional position restricting surfaces. Each of said restricting surfaces restricting a flexional connection state of the side plate 110, that is a flexional inner circumferential side flexional position restricting surface Yb and a flexional outer circumferential side flexional position restricting surface Ya, respectively.

Additionally, the above-mentioned coupling portion 113 includes, as shown in FIG. 5, a sheet-shaped central flexion allowable region 113a and proximal continuous regions 113b, 113b respectively having an increased plate thickness toward a front side plate portion 111 and a rear side plate portion 112. The central flexion allowable region 113a has a cross-sectional side view entirely constricted to a Japanese hand drum (tsuzumi).

As explained above, in the cable or the like protection and guide device 100 of the present invention, during linear position holding as shown in FIG. 2, the flexional outer circumferential side linear position holding surface Xa and the flexional inner circumferential linear position holding surface Xb abut on each other while the flexional inner circumferential side flexional position restricting surface Yb and the flexional outer circumferential side flexional position restricting surface Ya are respectively opened. In this way the linear position is reliably held without applying a load to the coupling portion 113. And during flexional position restriction as shown in FIG. 3, the flexional inner circumferential side flexional position restricting surface Yb and the flexional outer circumferential flexional position restricting surface Ya abut on each other while the flexional outer circumferential side linear position holding surface Xa and the flexional inner circumferential side linear position holding surface Xb are respectively opened. In this way the flexional position is reliably held without applying a load to the coupling portion 113.

It is noted that the maximum opening angle α formed by the flexional inner circumferential side flexional position restricting surface Yb and the flexional outer circumferential side flexional position restricting surface Ya can be set at a desired angle in accordance with the number and flexion radius of the side plates 110 formed in a continuous flexional position.

Therefore, in the cable or the like protection and guide device 100 of the present example, fewer parts are necessary and as such assembly is simplified. Inadvertent disconnection in the coupling portion 113 is prevented. Adjacent side plates 110 become attachable to and detachable from each other through three sets of concave portion/convex portion engagement mechanisms Sa, Sb and Sc provided on the flexional outer circumferential side and the flexional inner circumferential side, The maintenance of the device during connection and disconnection of the side plates can be easily performed.

The side plates are integrally formed of: a highly-rigid resin (M1) front side plate portion 111 connected to a preceding side plate 110'; a highly-rigid resin (M1) rear side plate portion 112 connected to a subsequent side plate 110; and, a flexible fatigue resistant resin (M2) coupling portion 113 integrally interposed between the front side plate portion 111 and said rear side plate portion 112. The highly-rigid resin (M1) a polyamide 6-GF compound agent is used as the fatigue resistant resin (M2) a polyamide 66-rubber compound agent. The front side plate portion 111 and the rear side plate portion 112 are strongly integrated through a two-color molded coupling portion 113. Thus, inadvertent disconnection is resolved. Further, since a coupling portion 113 made of a polyamide 66-rubber compound agent of a fatigue resistant resin (M2) is flexibly provided for repeated flexion, excellent fatigue resistance to repeated flexion is exhibited. And since the front side plate portion 111 and the rear side plate portion 112 are made of a polyamide 6-GF compound agent of a highly-rigid resin (M1), they concentrically transfer a flexional strain, which is liable to occur during a flexional operation, to the coupling portion to be absorbed therein. This enables the cable or the like protection and guide device of the present example to exhibit excellent stability and to maintain its form. Thus the effects of the present invention are very large.

DESCRIPTION OF REFERENCE NUMERALS

100 . . . Cable or the like protection and guide device
110 . . . Sideplate
111 . . . Front side plate portion
112 . . . Rear side plate portion
113 . . . Coupling portion
114a . . . Flexional outer circumferential side engagement protrusion
114b . . . Flexional inner circumferential side engagement protrusion
115a . . . Flexional outer circumferential side hole to be engaged
115b . . . Flexional inner circumferential side hole to be engaged
114c . . . Engagement protrusion
115c . . . Hole to be engaged
120 . . . Connecting arm
Sa, Sb, Sc . . . Concave portion/convex portion engagement mechanism
Xa . . . Flexional outer circumferential side linear position holding surface
Ya . . . Flexional outer circumferential side flexional position restricting surface
Xb . . . Flexional inner circumferential side linear position holding surface
Yb . . . Flexional inner circumferential side flexional position restricting surface C . . . Cable (Cables) or the like α . . . Maximum opening angle between flexional position restricting surfaces M1 . . . High rigid resin (polyamide 6-G compound agent)

M2 . . . Fatigue resistant resin (polyamide 66-rubber compound agent)

The invention claimed is:

1. A cable protection and guide device comprising: a number of pairs of right and left spaced side plates are articulately connected to each other in a longitudinal direction enabling said side plates to form a flexional circumferential bend having a flexional inner circumferential side and flexional outer circumferential side; each of said side plates includes a flexional inner circumferential side residing during bending on said flexional inner circumferential side of said bend; each of said side plates includes an outer circumferential side residing during bending on said outer flexional circumferential side of said bend; connecting arms are bridged over said flexional inner circumferential sides and said flexional outer circumferential sides of said side plates at predetermined intervals; a cable is accommodated in a cable accommodating space surrounded by said side plates and said connecting arms along the longitudinal direction, each of said side plates includes a front portion and said front portion is formed of a highly-rigid resin; said front portion of each of said side plates being connected to a preceding side plate; each of said side plates includes a rear side portion and said rear side portion is formed of a highly-rigid resin; said rear side plate portion being connected to a subsequent side plate; and, each of said side plates includes a flexible fatigue resistant resin coupling portion interposed between said front side plate portion and said rear side plate portion in an integrated manner using two-color molding.

2. A cable protection and guide device according to claim 1 wherein said highly-rigid resin is a polyamide 6-GF compounding agent and said fatigue resistant resin is a polyamide 66-rubber compounding agent.

* * * * *